United States Patent [19]

Wagenknecht et al.

[11] 4,175,384
[45] Nov. 27, 1979

[54] INDIVIDUAL BYPASS INJECTOR VALVES FOR A DOUBLE BYPASS VARIABLE CYCLE TURBOFAN ENGINE

[75] Inventors: Conrad D. Wagenknecht; Guy K. Faust, both of West Chester, Ohio

[73] Assignee: General Electric Company, Cincinnati, Ohio

[21] Appl. No.: 821,119

[22] Filed: Aug. 2, 1977

[51] Int. Cl.$^2$ .................................................. F02K 3/04
[52] U.S. Cl. ..................................... 60/226 B; 60/262
[58] Field of Search ............................. 60/226 B, 262

[56] References Cited
U.S. PATENT DOCUMENTS

| 3,841,091 | 10/1974 | Sargisson et al. | 60/226 B |
| 4,010,608 | 3/1977 | Simmons | 60/226 B |
| 4,043,121 | 8/1977 | Thomas et al. | 60/226 B |
| 4,072,008 | 2/1978 | Kenworthy et al. | 60/262 |

Primary Examiner—Carlton R. Croyle
Assistant Examiner—Thomas I. Ross
Attorney, Agent, or Firm—Robert C. Lampe, Jr.; Derek P. Lawrence

[57] ABSTRACT

A double bypass, variable cycle gas turbofan engine is provided with a variable area bypass injector which varies the area through which the inner bypass stream is injected into the outer bypass stream. The bypass injector comprises an upstream variable area, double bypass selector valve, the position of which determines whether the engine will operate in the single or double bypass mode, and a downstream static pressure valve which defines an optimum flow path for injecting the inner bypass stream into the outer bypass stream. The ability to vary the area through which the inner bypass stream is injected into the outer bypass stream permits the static pressure valve to operate as an ejector and permits control of the two bypass air streams through creation of a static pressure balance at the exit of the variable area bypass injector. The ability to control the bypass operating mode and the static pressure balance at the confluence of the two bypass streams eliminates the necessity for one exhaust duct and one exhaust nozzle, thereby reducing complexity and weight, and improves the engine-aircraft integration by reducing engine and nozzle diameters.

8 Claims, 3 Drawing Figures

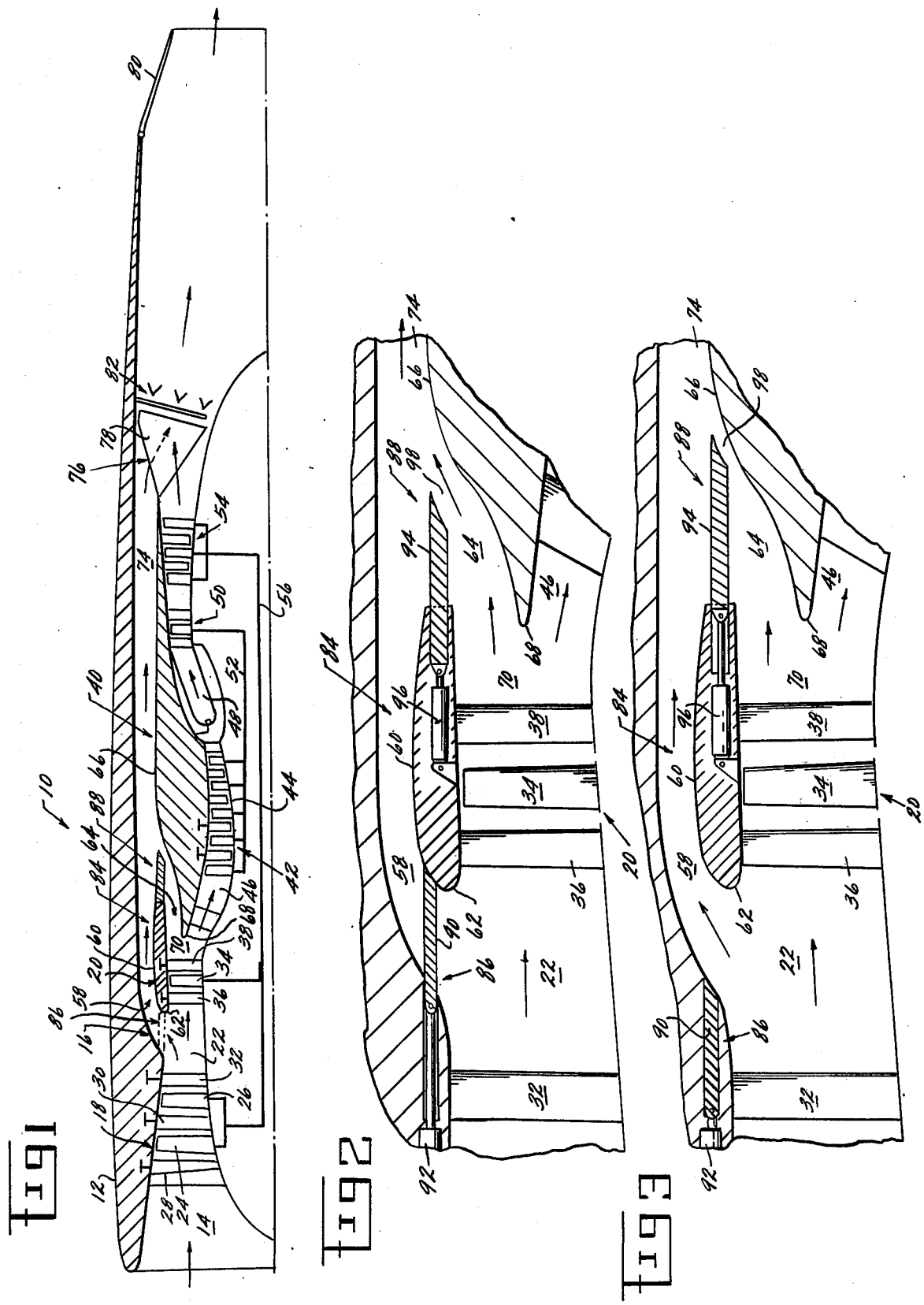

INDIVIDUAL BYPASS INJECTOR VALVES FOR A DOUBLE BYPASS VARIABLE CYCLE TURBOFAN ENGINE

The invention herein described was made in the course of or under a contract or subcontract thereunder with the Department of the Navy.

BACKGROUND OF THE INVENTION

The present invention relates to gas turbofan engines and, more particularly, to a double bypass, variable cycle gas turbofan engine wherein the bypass airflows may be controlled to permit elimination of an exhaust duct and an exhaust nozzle.

In recent years, much attention has been devoted to developing what have been generally referred to as "variable cycle" engines, a family of hybrid gas turbine engine which can operate with the high specific thrust characteristics of a low bypass ratio turbofan or turbojet as supersonic speeds and yet also exhibit the lower specific thrust, low noise and low fuel consumption characteristic of a high bypass ratio turbofan. The need for such variable cycle engines has arisen because of the need for an efficient multimission aircraft. Current aircraft having multimission requirements are powered by engines which are, of necessity, a compromise between the subsonic high bypass ratio turbofan and a supersonic augmented turbojet. As a result, what has emerged is a compromised low-to-moderate bypass ratio turbofan engine.

Several design approaches toward a truly variable cycle engine have been proposed. Such prior art systems have included various concepts employing retractable fans, variable area turbines, and variable pitch fans, as well as more complex techniques such as compound engines utilizing combinations of turbofan and turbojet engines in tandem or concentric flow relationship. In addition to a lack of flow flexibility, the weight associated with the "unused" portion of the engine during certain operating modes is an inherent disadvantage in aircraft applications.

One of the most attractive variable cycle engine concepts currently under consideration is a double bypass, variable cycle gas turbofan engine. The flow modulation potential is increased by splitting the fan into two sections, each in flow communication with a separate concentric bypass duct surrounding the core engine. It has been proposed to vary the bypass ratio (the ratio of the quantity of flow bypassing the core engine to that passing through it) by selectively mixing or separating one or more of the bypass duct streams and the core engine exhaust stream through various systems of valves and mixers.

However, one disadvantage to all such multiple bypass, variable cycle turbofan engines is that the number of exhaust nozzles has been equal to the number of flow ducts within the engine. Thus, the exhaust system for a double bypass, variable cycle engine required three separate ducts and nozzles to accommodate the three airstreams. Generally, as the number of ducts increases, weight increases. The present invention overcomes this disadvantage by reducing the number of exhaust nozzles and ducts required while still achieving the projected cycle variability of the double-type bypass, variable cycle engine.

SUMMARY OF THE INVENTION

It is therefore, a primary object of the present invention to provide a multiple bypass, variable cycle gas turbofan engine in which at least one exhaust duct and one exhaust nozzle can be eliminated to reduce complexity and weight while still achieving the projected cycle variability of the multiple bypass, variable cycle engine.

It is also an object of the present invention to provide a valve for installation in a double bypass gas turofan engine which selectively combines two separate fan streams to control whether the engine will operate in the single or double bypass mode.

It is yet another object of the present invention to provide a double bypass, variable cycle gas turbofan engine having a reduced number of flow ducts and nozzles which may be configured to operate over a wide range of flight Mach numbers without any abrupt changes or discontinuities in engine airflow.

It is still another object of the present invention to provide a valve for installation in a double bypass gas turbofan engine which will permit a reduction in the usual number of flow ducts and nozzles and which will permit efficient engine operation in a single bypass, augmented propulsive cycle and also a double bypass, nonaugmented propulsive cycle.

These and other objects and advantages will be more clearly understood from the following detailed description, the drawings and specific examples, all of which are intended to be typical of, rather than in any way limiting on, the scope of the present invention.

Briefly stated, the above objects are accomplished in the preferred embodiments of the present invention wherein a unique variable area bypass injector (VABI) is included in a double bypass, variable cycle engine for selectively mixing coannular bypass streams. The mixed stream is exhausted through a common variable area nozzle. All of the engine airflow is pressurized by a front fan section and the VABI includes an upstream variable area, double bypass selector valve which either directs all of the flow through an aft fan section for operation in the single bypass mode, or splits the flow into a first portion which bypasses the second fan section and a second portion which is further pressurized by the second fan section for operation in the double bypass mode. The streams are then recombined downstream of the double bypass selector valve and second fan section.

In order to control the static pressure of the two bypass streams at their point of confluence, the VABI also incorporates a static pressure valve which defines an optimum flow path for injecting the inner bypass stream into the outer bypass stream. In effect, the static pressure valve functions as an ejector for the inner bypass stream and creates a static pressure balance at the exit of the VABI. The ability to control the bypass operating mode and the static pressure at the confluence of the two bypass streams eliminates the necessity for one exhaust duct and one exhaust nozzle, thereby reducing complexity and weight.

The invention may also be utilized in combination with a downstream diverter valve, a downstream VABI, or a variable area mixer to combine the bypass flow with the core engine gas stream. These latter devices, when utilized with the invention, provide a variable cycle gas turbofan engine having a high degree of flow modulation which may be operated efficiently through a broad range of engine thrust settings and bypass ratios.

DESCRIPTION OF THE DRAWINGS

While the specification concludes with claims particularly pointing out and distinctly claiming the subject matter of the present invention, it is believed that the invention will be more fully understood from the following description of the preferred embodiments which is given in connection with the accompanying drawings in which:

FIG. 1 is a schematic cross-sectional view of a split fan, double bypass engine incorporating the present invention;

FIG. 2 is an enlarged fragmented view of a portion of the gas turbine engine of FIG. 1 in one mode of operation; and FIG. 3 is an enlarged fragmented view, similar to FIG. 2, depicting a different mode of operation.

DESCRIPTION OF THE PREFERRED EMBODIMENT

Referring to the drawings, wherein like numerals correspond to like elements throughout, attention is first directed to FIG. 1 wherein an engine depicted generally at 10 and embodying the present invention is diagrammatically shown. This engine includes an outer casing or nacelle 12, the upstream end of which forms an inlet 14 sized to provide a predetermined design airflow to the engine 10. Disposed within the inlet 14 is a fan shown generally at 16 for receiving and compressing the airflow delivered by the inlet 14. The fan 16 includes a front section 18 axially displaced from an aft section 20 by an axial space designated generally at 22. This arrangement is similar to that disclosed in U.S. patent application Ser. No. 682,307, filed by Bernard L. Koff et al on Feb. 25, 1974 and assigned to the same assignee as the present invention. Front section 18 includes two rows of rotor blades 24 and 26 interspaced between rows of variable inlet guide vanes 28 and variable stator vanes 30 and 32. Similarly, the aft fan section 20 includes a stage of rotor blades 34 interspaced between rows of aft fan variable stator vanes 36 and 38.

Downstream of the fan 16 there is provided a core engine 40 including an axial flow compressor 42 having a rotor 44. Air compressed by fan 16 enters core engine inlet duct 46, is further compressed by the axial flow compressor 42 and then is discharged to a combustor 48 where fuel is burned to provide high energy combustion gases which drive a core engine turbine 50. Turbine 50, in turn, drives the rotor 44 through a shaft 52 in the normal manner of a gas turbine engine. The hot gases of combustion then pass to and drive a fan turbine 54 which, in turn, drives the fan 16 through shaft 56.

In order to bypass a portion of the fan airflow around the core engine 40, there are provided two concentric bypass ducts. An outer duct, shown generally at 58, is provided between the engine outer casing 12 and an intermediate casing 60. The upstream end 62 of the intermediate casing 60 terminates in the annular space 22 between the front and aft fan sections such that air entering the engine inlet 14 and compressed by the front section 18 may be thereafter divided between the outer bypass duct 58 and the aft fan section 20. The inner bypass duct shown generally at 64 is formed between the intermediate casing 60 and an inner casing 66 housing core engine 40. The upstream end 68 of inner casing 66 terminates in an axial space 70 separating the aft fan section 20 and core engine 40 such that airflow compressed by an exiting aft fan section 20 is divided between the inner bypass duct 64 and inlet 46 to the core engine 40. At the downstream end of intermediate casing 60, the outer bypass duct 58 and inner bypass duct 64 merge into a common bypass duct 74.

The combined flow through duct 74 is further mixed with the core engine combustion gases exiting the low pressure turbine 54 in the region shown generally at 76. For this purpose, a suitable mixer shown generally at 78 is provided at the downstream end of inner casing 66. This mixer 78 is preferably of the variable area type as disclosed in U.S. patent application Ser. No. 583,055 filed by J. Rundell et al on June 2, 1975. A propulsive force is thus obtained by the action of the combined bypass and core engine exhaust streams being discharged from a variable area exhaust nozzle 80. To further increase thrust at high Mach numbers, an afterburner shown schematically at 82 may be provided downstream of the mixer 78.

Prior art multibypass variable cycle gas turbine engines have required three coaxial propulsive streams, two bypass streams and one core engine exhaust stream, because the fan airflow is extracted at two positions in the compression system, thus creating two fan airstreams having different energy levels. Heretofore, it has been proposed to duct these two fan airstreams aft and exhaust them through separate nozzles (typically of the variable area type) and exhaust the core engine hot gases of combustion through a separate nozzle for a separate flow, double bypass, variable cycle engine. In mixed flow, double bypass, variable cycle engine configurations, it has been proposed that the inner fan airstream be mixed with the core engine hot gases of combustion and exhausted through a common core nozzle circumscribed by a separate nozzle exhausting the remaining outer bypass duct flow. The invention now to be described eliminates the need for one of the bypass ducts and nozzles by controlling the airflow characteristics of the fan 16 and mixing the two fan airstreams in the common bypass duct 74.

The airflow characteristics of fan 16 are controlled through a variable area bypass injector (VABI) designated generally at 84. The VABI is associated with the intermediate casing 60 which separates the outer bypass duct 58 from the inner bypass duct 64. The VABI comprises generally two variable geometry flow devices, a double-bypass selector valve 86 and a static pressure valve 88. Referring now to FIGS. 2 and 3, the double bypass selector valve is shown to comprise a translating valve 90 which, in the closed position of FIG. 2, seals the forward portion of duct 58 such that air pressurized by front fan section 18 cannot pass from space 22 into the outer bypass duct 58. Translating valve 90 also precludes the reverse flow of bypass air from duct 58 into space 22 and through aft fan section 20 in operating modes soon to be described. Translation of flap 90 is accomplished by means of a hydraulic actuator 92 of a variety well known in the art. Valve 90 is translated to the position of FIG. 2 in the single bypass mode of operation which occurs during augmented engine operation and under high cycle pressure ratio requirements. Accordingly, during this single bypass operating mode, all of the air pressurized by forward fan section 18 is directed through aft fan section 20 and is then split into two portions entering either core engine inlet duct 46 or inner bypass duct 64.

The static pressure valve 88 comprises a translating section 94 of the downstream portion of intermediate case 60. Translating section 94 is positioned by means of another hydraulic actuator 96 of a well-known variety between the operative positions shown in FIGS. 2 and 3. It is to be noted that in the operative position of FIG. 3, wherein the translating section is at its full aft position, an orifice 98 is formed between translating section 94 and inner casing 66. The static pressure valve 88 shown in the open position of FIG. 2 defines, in conjunction with inner casing 66, an optimized diffuser flow path for the passage of pressurized air from inner bypass duct 64. The static pressure valve 88 discharges the inner bypass stream, at the discharge of the VABI, by free expansion into the common bypass duct 74. In the single bypass operating mode of FIG. 2, the outer bypass duct 58 is pressurized to a level above that in space 22, thereby requiring closure of the double bypass selector valve 86 to prevent recirculation of air and stalling of the front fan section 18. The pressurized bypass flow is then ducted aft through common bypass duct 74 to be mixed with the core engine flow and discharged through nozzle 80.

In the double-bypass operating mode, typical of nonaugmented, high bypass ratio gas turbofan operation, the static pressure valve 88 is translated aft to the position shown in FIG. 3. This position of the static pressure valve accelerates the inner bypass duct 64 airstream at the exit of the VABI through orifice 98, thereby lowering the local static pressure. The static pressure valve, in combination with inner casing 66 and common bypass duct 74, is designed to operate as an ejector which pumps the outer bypass duct 58 air pressure to values lower than that in space 22 behind the front fan section 18. The transition of pressurized fan air into the outer bypass duct 58 is accomplished by translating the double bypass selector valve to the open position of FIG. 3 while simultaneously modulating the static pressure valve 88 in order to control the flow pumping of the ejector and the local static pressure balance entering common bypass duct 74.

After translating the static pressure valve during the transition from single to double bypass operation, the double bypass selector valve 86 is opened and flow modulation is accomplished through the static pressure valve 88 which controls the relative flow of pressurized fan air through the outer and inner bypass ducts 58 and 64, respectively. The energy levels between the bypass airstreams in ducts 58 and 64 are considerably different due to the additional pressurization of the air passing through aft fan section 20 prior to entering duct 64. The static pressure valve 88 controls these two bypass airstreams by creating a static pressure balance at the VABI exit. This static pressure balance is achieved by selectively varying the relative area of the two bypass ducts at the VABI exit. The relative area of the two ducts is varied through the position of the variable geometry static pressure valve 88 which has the flexibility to operate over a wide range of flow conditions. The VABI of the present invention is, thus, capable of balancing the static pressures of the outer and inner bypass streams by selectively varying the area through which the inner bypass stream is injected into the outer bypass stream rather than having to rely upon the total pressures of the two bypass streams to establish the static pressure balance therebetween, recognizing the interdependence of the total and static pressures at the mixing location. Since the majority of double bypass, variable cycle engine operations produces subsonic flow in the inner and outer bypass ducts, the flows may be coupled at their point of confluence at the inlet of common bypass duct 74 through static pressure balance. However, the VABI of the present invention is also designed to accommodate the operating conditions experienced by the double bypass, variable cycle engine during wide excursions in fan operating characteristics which necessitate the mixing of subsonic and supersonic flow regimes in the common bypass duct 74.

Therefore, the variable area bypass injector of the present invention comprises a device for modulating and mixing two fan bypass airstreams with high efficiency. The ability to balance the static pressure of the two bypass streams at their point of confluence by controlling the relative area of the two bypass ducts at that location eliminates the necessity of one exhaust duct and one exhaust nozzle, thereby resulting in reduced complexity and weight and improved engine installation characteristics due to a smaller engine diameter and a reduced nozzle diameter.

It should be obvious to one skilled in the art that certain changes can be made to the above-described invention without departing from the broad, inventive concepts thereof. For example, the variable area bypass injector of FIG. 1 is shown as a portion of variable cycle engine in which the forward and aft sections are driven from a common low pressure turbine 54 at the same rotational speed. It is clear, however, that the aft fan section could be rotated by the high pressure turbine 50 of the core engine and the front fan section 18 driven by the low pressure turbine 54 downstream of the core engine. Such an arrangement is taught in U.S. Pat. No. 4,010,608—John R. Simmons which is assigned to the same assignee as the present invention. Such an arrangement divides the fan workload between the low and high pressure turbines to permit efficient utilization of the total available turbine capacity and a reduction in low pressure turbine workload. This permits the gas turbine engine to achieve a higher bypass ratio for a given low pressure turbine energy extraction potential than is characteristic of gas turbine engines in which the entire fan is coupled only to the low pressure turbine system, thereby increasing the variability of the variable cycle engine. The VABI of the present invention is equally applicable to such a split fan work gas turbine engine.

Additionally, in the variable cycle engine of FIG. 1, the combined bypass airstreams in common bypass duct 74 are ducted aft and mixed with the hot gases of combustion from the core engine in a representative mixer 78 prior to being exhausted through a common variable area propulsive nozzle 80. This is referred to as a mixed flow turbofan variable cycle engine. However, a separate flow turbofan variable cycle engine in which the common bypass duct terminates in a separate nozzle coannular with a core engine propulsive nozzle could also utilize the variable area bypass injector of the present invention since its function of mixing the inner and outer bypass airstreams remains substantially the same.

Furthermore, with regard to the details of the variable area bypass injector itself, such an injector is not limited to translating valves actuated by simple hydraulic actuators. The same functions may also be accomplished with variable flaps, movable duct walls or splitters and, for some cycles, aerodynamically self-positioning geometry. It is intended that the appended claims cover these and all similar variations in the Applicant's broader inventive concepts.

Having thus described the invention, what is claimed as novel and desired to be secured by Letters Patent of the United States is:

1. A method for modulating the bypass flows of a gas turbofan engine having a core engine, a front fan section for pressurizing air, an outer bypass duct for bypassing a stream of pressurized air around the core engine, an aft fan section for further pressurizing air discharged from the front fan section, an inner bypass duct for bypassing an airstream from the aft fan section around the core engine, and a common bypass duct for receiving confluent flow from the inner and outer bypass ducts and bypassing the confluent flow around the core engine, comprising the step of:
varying the area through which the inner bypass airstream is injected into the common bypass duct to match the static pressure of the inner bypass stream to the static pressure of the outer bypass stream prior to mixing the two streams at their point of confluence.

2. The method as recited in claim 1 further comprising the steps of accelerating the inner bypass airstream to reduce the static pressure within the outer bypass duct to a value less than that of the air exiting the front fan section, and opening the outer bypass duct to receive a portion of the pressurized air from the front fan section, and thereafter varying the area through which the inner bypass airstream is injected into the common bypass duct to match the static pressure of the outer bypass stream prior to mixing the two streams at their point of confluence.

3. The method as recited in claim 1 further comprising the steps of closing the outer bypass duct to the flow of air from the front fan section, further pressurizing all of the air from the front fan section through the aft fan section, and expanding the inner bypass stream into the common bypass duct.

4. The method as recited in claim 3 further comprising the steps of thereafter mixing the common bypass duct stream with fuel and combusting the resulting mixture.

5. An improved gas turbofan engine of the type having a core engine, a front fan section for pressurizing a flow of air, an outer bypass duct for bypassing a stream of pressurized air around the core engine, an aft fan section for further pressurizing the air discharged from the front fan section and an inner bypass duct for bypassing an airstream from the aft fan section into the outer bypass duct and around the core engine, wherein the improvement comprises:
a common bypass duct for receiving confluent streams from the inner and outer bypass ducts and bypassing the confluent flow around the core engine; and
a variable area bypass injector for selectively modulating and separating the airstreams through the inner and outer bypass ducts including static pressure valve means for varying the area through which the inner bypass duct airstream is injected into the common bypass duct at the point of confluence of the inner and outer bypass ducts, and a bypass selector valve associated with the outer bypass duct and which is operable between two positions, one at which flow through the outer bypass duct is prohibited and another at which flow through the outer bypass duct is permitted.

6. The improved gas turbofan engine as recited in claim 5 wherein said static pressure valve means comprises a translating section of an intermediate casing disposed between and partially defining said inner and outer bypass ducts at their point of confluence and means for positioning said translating section, and wherein said translating section cooperates with an inner casing housing said core engine to define a variable area orifice for the passage of the inner bypass stream therebetween.

7. The improved gas turbofan engine as recited in claim 5 wherein said bypass selector valve comprises a translating valve positionable between a first position where it seals the end of the outer bypass duct proximate the front fan section and a second position where it is retracted into an outer casing partially defining the outer bypass duct, and means for translating said valve between the two positions.

8. A gas turbofan engine of the type having a front fan section for pressurizing a flow of air, generally coannular inner and outer bypass ducts for receiving the flow of air as airstreams and, a variable area bypass injector for selectively modulating the pressurized airstreams passing through the generally coannular inner and outer bypass ducts and for selectively mixing the airstreams in a common bypass duct wherein the variable area bypass injector comprises:
a two-position bypass selector valve associated with the outer bypass duct, said valve having a first position essentially parallel to the pressurized airflow wherein flow through the outer bypass duct is prevented and a second position wherein an airstream is permitted to flow through the outer bypass duct; and
static pressure valve means for varying the area through which the inner bypass duct airstream is injected into the common bypass duct at the point of confluence of the inner and outer bypass ducts.

* * * * *